June 4, 1968  S. C. SCHUMAN  3,387,054
CONVERSION OF $C_4$, $C_5$ HYDROCARBONS WITH ELEMENTAL SULFUR
AND METAL SULFIDE CATALYST
Filed June 7, 1965  2 Sheets-Sheet 1

INVENTOR
SEYMOUR C. SCHUMAN

# United States Patent Office 3,387,054
Patented June 4, 1968

3,387,054
CONVERSION OF $C_4$, $C_5$ HYDROCARBONS WITH ELEMENTAL SULFUR AND METAL SULFIDE CATALYST
Seymour C. Schuman, Rocky Hill, N.J.
(360 Jefferson Road, Princeton, N.J. 08540)
Filed June 7, 1965, Ser. No. 461,767
19 Claims. (Cl. 260—680)

ABSTRACT OF THE DISCLOSURE

An aliphatic hydrocarbon containing 4 or 5 carbon atoms (e.g., n-butane) is reacted with elemental sulfur in contact with a solid metal sulfide catalyst at a temperature between 650° F. and 1100° F. to produce, as a major reaction product, a hydrocarbon having the same number of carbon atoms but at least one more ethylenic bond (e.g., butadiene).

---

Figure 1:
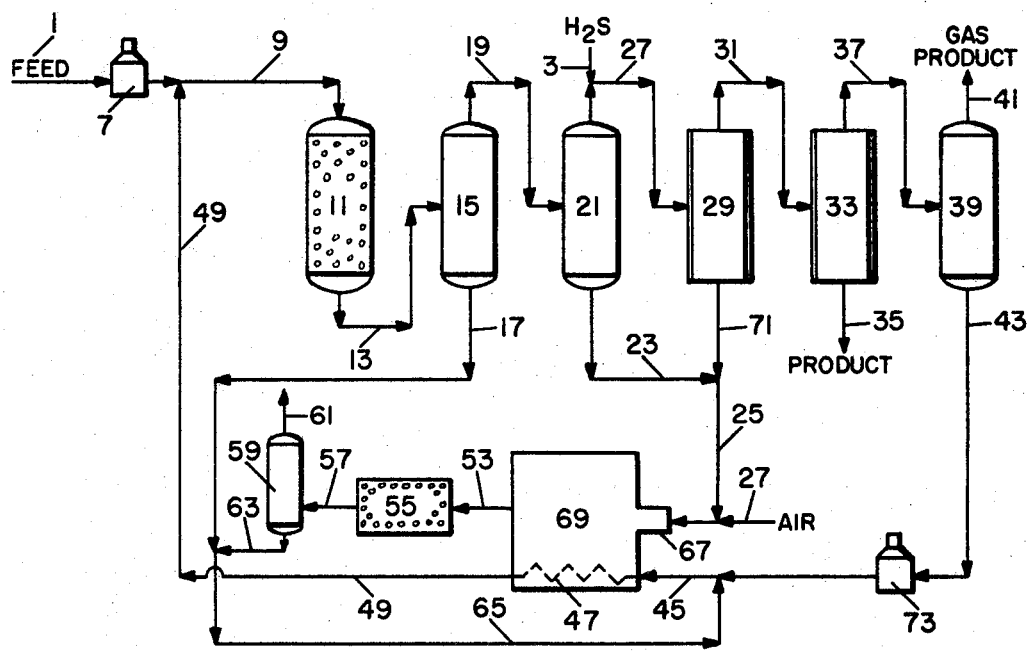

This invention relates to the conversion of hydrocarbons containing four or five carbon atoms to produce various valuable unsaturated $C_4$ or $C_5$ hydrocarbons, particularly butylenes, butadiene and isoprene.

As is well known, butadiene ($C_4H_6$) and isoprene ($C_5H_8$) are very important petrochemical intermediates for the production of synthetic rubber. Butylene ($C_4H_8$) is also of importance for the production of alkylate, a superior component of high octane gasoline. These olefines and diolefines of four and five carbon atoms are prevalently derived from analogous, more saturated, $C_4$ and $C_5$ compounds by dehydrogenation. Totally saturated butanes ($C_4H_{10}$) and pentanes ($C_5H_{12}$) are the preferred raw materials because these may be obtained directly from petroleum or natural gas and are inexpensive. Yet, despite the low cost of these raw materials, the corresponding derivative olefines and diolefines are substantially more expensive, primarily as a result of fundamental difficulties in the dehydrogenation step. These difficulties ultimately stem from the thermodynamics and energy relationships involved in such dehydrogenations.

The thermodynamics of producing butadiene from butane by simple dehydrogenation $$C_4H_{10} \rightarrow C_4H_6 + 2H_2$$

has been comprehensively discussed by several authors including Hornaday, Advances in Petroleum Chemistry and Refining, vol. IV, Manufacture of Mono and Diolefins from Paraffins by Catalytic Dehydrogenation, Hornaday et al., pp. 450–488, Interscience, New York (1961). Data provided by Hornaday show that, to obtain practical yields of butadiene from butane by simple dehydrogenation, (1) a temperature of 1100° F. is required, (2) subatmospheric pressures of the order of 5 inches of mercury absolute are highly desirable, (3) butylenes and probably butane itself must be recycled to improve butadiene yields and (4) reaction heat requirements per pound of butadiene produced are very large, corresponding to 2000 B.t.u./pound.

Based on these thermodynamic data, processes have been developed which produce butadiene from butane and butylene commercially by simple dehydrogenation. The Houdry process, comprehensively discussed by Hornaday, supra, is most widely used. As cited by Hornaday, the reaction temperature is 1100° F., and the reaction pressure is 5 inches of mercury absolute (requiring the use of evacuation and tightly constructed equipment). Under these conditions and with a catalyst reported to be substantially chromium oxide on alumina, net yields are 57.7% butadiene, 34.3% fuel gas and 8.0% coke (Hornaday, pp. 477–482). Apparently, at the high temperatures required, there is much cracking to make fuel gas and polymerization to produce coke, with a substantial loss in butadiene yield.

To avoid the use of tubular reactors fired by furnaces to supply the large heat requirements of the process, the Houdry process utilizes the heat obtained by regenerating the coke and adds an inert heat carrier to the catalyst to provide a heat sink so that the reaction temperature (which falls continuously during the on-stream period) will not swing over too broad a range, further decreasing selectivity. Thus, the Houdry process may use five reactors only two of which are "on stream" at any one time, two others being regenerated and one being purged (Hornaday, p. 472). It should likewise be observed that the two reactors on stream are much larger than they would have to be in the absence of the large quantity of inert heat carrier which is required. This inefficient use of overall reactor capacity, the requirement of complex timing cycles (the on-stream period for a given reactor is only 15–30 minutes), the poor yields of butadiene, and other factors result in a relatively high cost for the butadiene produced.

A similar situation exists for the production of isoprene and butylene, as likewise discussed by Hornaday.

In view of these difficulties of the simple dehydrogenation process, it has been proposed to employ oxygen to carry out the reaction. This reaction can be represented in the production of butadiene by the equation:

$$C_4H_{10} + O_2 \rightarrow C_4H_6 + 2H_2O$$

Although thermodynamic data for such an "oxidative dehydrogenation" indicate the desirable result of the possibility of almost complete conversion of butane at temperatures as low as 700° F., the fact is that this reaction is highly exothermic, with a theoretical heat release of 1930 B.t.u. per pound of butadiene. As is well known, it is difficult to obtain high yields of valuable products in exothermic reactions utilizing oxygen or air because of the tendency to complete combustion, which in this case would be represented by $$C_4H_{10} + 6.5\ O_2 \rightarrow 4CO_2 + 5H_2O$$

with the very high heat release of 22,000 B.t.u. per pound of butane reacted. Whether the poor product yields ultimately obtained by oxidative dehydrogenation result from the fact that, at the temperature required to initiate the reaction, the rate of reactions leading to complete combustion is of the same order as that leading to the desired derivatives, or from the fact that the high exothermic heat results in "hot spots" on the catalyst, or from still other mechanisms is not precisely known. The fact remains, however, that oxidative dehydrogenation has not supplanted simple dehydrogenation to produce butadiene commercially. Nor has such art as that exemplified by U.S. Patents Nos. 2,991,320; 2,991,321; 2,991,322 (which invlove the use of oxidative dehydrogenation to produce butadiene from very valuable butene instead of from the much more available and less expensive butane).

I have found that the conversion of saturated $C_4$ and $C_5$ hydrocarbons to more unsaturated derivatives can be carried out with a great improvement over known processes as cited above. The primary reaction of my process, herein designated as sulfoxidation, is the abstraction of hydrogen using elemental sulfur, such as for example $$C_4H_{10} + S_2 \rightarrow C_4H_6 + 2H_2S$$

(For simplicity, here and elsewhere, I have used the formula $S_2$ for elemental sulfur, although it is well known to those skilled in the art that elemental sulfur may exist as $S_2$, $S_6$, $S_8$ and the like). In practically all cases the hydrogen sulfide formed in the reaction as above will be reconverted to elemental sulfur by the well-known reaction conventionally designated as the Claus reaction $$2H_2S + O_2 \rightarrow 2H_2O + S_2$$

and herein designated as the reconversion step. The summation of the two reactions, i.e.

$$C_4H_{10} + O_2 \rightarrow C_4H_6 + 2H_2O$$

is the well-known reaction of oxidative dehydrogenation. Thus, when the sulfoxidation reaction and the reconversion step are practiced concurrently, the overall process may be considered as a device to avoid the undesirable features of oxidative dehydrogenation, as well as a unique alternate to simple dehydrogenation.

Table A provides thermodynamic data for sulfoxidation to produce butadiene. As shown by the data, in the practice of my invention there is no need to utilize the high temperatures, low pressures and high hydrocarbon recycle rates used in simple dehydrogenation as typified by the Houdry process; the data of Table A show that sulfoxidation can be used to produce very high single-pass yields of butadiene at temperatures as low as 700° F. and at atmospheric pressures. At these conditions high selectivity to butadiene may be obtained, and long process on-stream periods before the need to burn off coke.

TABLE A.—THERMODYNAMICS OF THE SULF-DEHYDROGENATION OF BUTANE TO BUTADIENE

[Pressure: 30 Inches Mercury Absolute]

| Temperature, ° F. | Equilibrium Composition, Mole Percent | | |
|---|---|---|---|
|  | Butane | Butylene | Butadiene |
| 700 | 3 | 17 | 80 |
| 800 | 2 | 14 | 84 |
| 900 | 1 | 12 | 87 |
| 1,000 | 0.7 | 10 | 89+ |
| 1,100 | 0.4 | 9 | 90+ |

NOTE.—Heat required: 570 B.t.u./pound of butadiene.

Another important feature of this invention is that the sulfoxidation reaction is mildly endothermic. Thus, when producing butadiene, heat requirements for sulfoxidation are only 570 B.t.u./pound of butadiene (compared with a requirement of 2000 B.t.u./pound for simple dehydrogenation and contrasted with the liberation of large amounts of heat in oxidative dehydrogenation). When low temperatures are employed in sulfoxidation, the small amount of heat required may be readily obtained by preheating the feed to suitable temperatures with little or no cracking, and carrying out the reactions adiabatically. When moderate temperatures are employed in sulfoxidation, tubular reactors fired with small heat fluxes may be just as readily employed.

In contrast with the work of Hansford and co-workers (e.g., U.S. Patents Nos. 2,450,658, 2,450,659, 2,450,685, 2,450,686, 2,450,687) which explicitly omits catalysts, the process of my invention utilizes various metal sulfides, prepared as will be described, as catalysts for the sulfoxidation reaction. These catalysts make it possible to operate at temperatures of 650° F. to 1100° F. and preferably at temperatures of between 750° F. to 1000° F., instead of the temperatures of 1100° F. to 1300° F. substantially employed by Hansford. With the catalysts and low temperatures herein employed, yields of undesirable thiophene and tars are almost negligible, whereas Hansford et al. produced these materials as major products.

A collateral advantage of the catalysts and low temperatures used in my process is that suitable contact times may be employed, i.e. usually of the order of one second, again in contrast with the work of Hansford et al., wherein contact times as low as 0.01 second are specified, with the vast bulk of the work at about 0.1 second or less. Such low contact times of Hansford et al. required separate preheating of the feed hydrocarbon and sulfur, since if the reactants had been heated together, the reaction would have been consummated and indeed over-consummated in the long time required in the preheater. In contrast, the lower temperatures and longer contact times of my process permit preheating both of the reactants in contact with each other, so that the choice of whether to preheat the reactants separately or together can be made on strict cost bases. In addition, the use of low temperatures in my process, considerably reduces yields of carbon disulfide over those obtained by Hansford, again increasing selectivity to unsaturated hydrocarbons such as butylene, butadiene or isoprene.

The sulfides of molybdenum, vanadium, chromium, tungsten, cobalt, and nickel are preferred active catalytic components for this invention. However, many other sulfides in periodic groups IV-A, IV-B, V-A, V-B, VI-A, VII-A and V-III will similarly be active, as well as the sulfides of numerous of the rare earth metals with atomic numbers between 59 and 72. Typical active metals in each of these groups are Ce(IV-A), Zn(IV-B), Ta(V-A), Bi(V-B), U(VI-A), Mn(VII-A) and Ru(VIII) as well as rare earths such as Dy.

Suitably prepared mixtures of more than one of the above sulfides may be more active than the separate components individually. For example, it is well known that mixtures containing both cobalt and molybdenum are more active than the separate components. Nickel and tungsten seem similarly to enhance the activity of each other. The reason for such co-promotion is not generally known.

Catalysts used in this invention may be in admixture or in combination with relatively inert materials such as, for example, activated alumina, silica gel, activated clays, alumina gel, magnesia gel, zirconia gel, activated bauxites, synthetic aluminum silicates and the like. The use of such "supports" to enhance the activity of metals and metal compounds is common practice. It is presumed that such supports disperse active metals and metal compounds in such a way so as to make them more available to reactants. Even inert materials with little extended surface such as carborundum, carbon black, alundum, pumice and the like are of value to extend the availability of active catalytic components. These materials are particularly important in this invention when the active catalytic component is of high cost, such as when Pt, Ce or Ru is employed.

Promotion with alkali compounds particularly those of potassium and secondarily those of sodium, lithium and rubidium may be employed. In this case the alkali compound ultimately comprises not more than 5% and preferably between 1% and 2% by weight of the catalyst.

The catalyst may be prepared by any of the methods known to those skilled in the art. This includes mixing dry powders, pasting dry powders, impregnating or precipitating active components onto the support, or in some cases, coprecipitating all of the catalyst components simultaneously. The catalyst components are in most cases then pelleted, extruded, spheroidized or otherwise formed into desired sizes and shapes. As in common practice, the particles are then preferably dried and calcined at a temperature above 900° F.

Although the raw materials for the catalysts used in my invention may be metal salts such as nitrates, carbonates, sulfates, phosphates, acetates, and the like, or the metal oxides, or in rare cases the metals themselves, which then may be further converted in the process of catalyst preparation generally to oxides, the catalytic components which are extant and active in the process of this invention are substantially metal sulfides. Conversion to the sulfides may be effected by treating the catalyst after calcination with sulfur-containing compounds such as hydrogen sulfide, mercaptans, or thiophenes, with or without hydrogen. Such conversion may also be carried out in the same reactor used for the process of this invention. In some cases, such a pretreatment does not have to be effected since the active catalytic sulfide may be formed by initiating the reaction between the hydrocarbon and elemental sulfur as in the process of this invention. However, in all cases, the process is carried out over one or more metal sulfides which substantially catalyze the desired sulfoxidation reactions.

Preferred hydrocarbon feeds for this invention are saturated $C_4$ or $C_5$ hydrocarbons. Such hydrocarbon feeds may be most conveniently or economically obtained from commercially available sources in admixture with saturated hydrocarbons of other carbon numbers, or with olefines or other components. For example, normal butane obtained from cracking, suitable as a feed for this invention, may contain minor amounts of propane, isobutane, pentanes, butylenes and the like. As will be apparent, hydrocarbons may be recycled in the process of this invention, in which case the total feed to the reactor will contain various saturated and unsaturated hydrocarbons as most economically desirable.

Elemental sulfur is a standard item of commerce and the net elemental sulfur used in the process of this invention may include any of the grades conveniently available. However, as previously mentioned, an economically important feature of the invention is the reconversion of the hydrogen sulfide formed in the sulfoxidation step to elemental sulfur by the additional reaction $$2H_2S + O_2 \rightarrow 2H_2O + S_2$$

Thus, theoretically, the net feed of elemental sulfur to the process is zero; actually, however, because of unavoidable losses, a small amount of net elemental sulfur will always be required. This net quantity of elemental sulfur, depending on various minor and subsidiary aspects of the process, must be determined empirically. However, the preferable quantity of elemental sulfur in the total feed to the sulfoxidation step is not less than 0.25 mole of $S_2$ per mole of $C_4+C_5$ hydrocarbons in the total feed, and not greater than 2.5 moles of $S_2$ per mole of $C_4+C_5$ hydrocarbons, a range which will permit in every case of the application of this invention an economically significant extent of sulfoxidation with minimum formation of undesirable organic sulfur compounds and tar.

Conceivably, a net feed of steam and/or oxygen may be added to the sulfoxidation reactants to produce minor benefits. However, it is emphasized that these components are not necessary to the process of this invention. If they are added, steam and/or oxygen must be added in such quantities so as not to convert the catalytic active components substantially from sulfides to oxides.

As emphasized previously, sulfoxidation reaction temperatures are substantially below those in simple dehydrogenation and generally below those employed by Hansford et al. who did not employ catalytic contact agents. Depending on the catalyst used and on other factors, particularly the composition of the combined feed to the reactor, reaction temperatures from 650° F. to 1100° F. satisfy the kinetic and thermodynamic requirements of the reaction. However, more preferable reaction temperatures which better satisfy engineering and economic requirements are in the range from 750° F. and 1000° F.

The sulfoxidation reactor pressure is essentially atmospheric, e.g., from 5 p.s.i.a. to 100 p.s.i.a. However, pressures below atmospheric are not necessary as in the simple dehydrogenation, nor are pressures substantially above atmospheric required or desirable except for economic design of recovery equipment. Actually, such engineering considerations, including the pressure drop across the catalyst bed and recovery equipment, to a major extent determine the average pressure in the reactor.

At these conditions of pressure and temperature, and with the feeds and products specified, the feed and products will be substantially (and, in most cases, all) in the vapor phase. Under these conditions, the catalyst may be employed in any kind of a reactor system suitable for the purpose. These include upshot and downshot fixed beds, moving beds, fluid beds and the like. However, a conventional fixed bed is preferred, since the need to transfer heat or regenerate carbon within the reactor is not of outstanding importance in this invention, and only minor advantages seem to be gained from use of the more complex and expensive moving or fluid bed systems. In most cases the preferred fixed bed arrangement for the catalyst may be conveniently obtained using conventional large diameter cylindrical reactors which are simply insulated without the need to transfer heat to or from the reactor. As previously described in detail, this simple and economic method of containing the catalyst in an adiabatic reactor system is a feature of this invention and is ultimately a consequence of the use of sulfoxidation with a sulfidic catalyst. Thus, in most cases, the total reactor feed may be preheated above reaction temperatures without significant decomposition of the reactants, the feed entering the reactor at essentially the preheat temperature and cooling somewhat as it passes through the reactor, because of the mild endothermic heat of reaction. In some cases however, using not highly active but very selective catalysts at temperatures of 900° F. or above, it may be desirable to utilize tubular reactors heated externally by the combustion of hydrocarbon gases or other fuels. Since endothermic heat requirements are relatively low and in fact may be partially supplied by feed preheat, the tubes containing the catalyst can be readily heated without heating the tube walls and contiguous catalyst excessively. Thus, in this case, the low heat flux required in catalytic sulfoxidation substantially avoids high gas and coke formation usually obtained from overheating of the reactor walls in such tubular furnaces.

In the process of this invention quenching of the reaction products may or may not be required. When the sulfoxidation reaction is carried out at the lower limits of the temperature range specified, quenching is usually not required since non-catalytic reactions will not occur at any appreciable rate at these temperatures. However, when reaction is carried out at the higher limits of the temperature range specified, quenching of the reactor effluent stream may be desirable. This can be carried out by contacting the reactor effluent gases with any liquid, preferably one available such as elemental sulfur or feed or product hydrocarbons, the amount of the liquid used and its temperature being such as to decrease rapidly the temperature of the effluent to the desired level.

In the process of this invention, coke yields vary considerably depending on the feed, reaction temperature and pressure, extent of single pass conversion, catalyst and, in fact, on every operating variable. However, coke yields are substantially lower than in simple dehydrogenation processes, so that elaborate time control regeneration procedures are not required. It is desirable to regenerate the catalyst periodically, however, and this may be accomplished using air, dilute oxygen, oxygen and steam and the like, as conventionally practiced for many other catalytic hydrocarbon conversion processes. After such a regeneration, it may often be necessary to resulfide the catalyst before further use. A more unique regeneration procedure is to use elemental sulfur for regeneration instead of oxygen-containing gases. When elemental sulfur is used, the coke on the catalyst is removed by reaction to produce carbon disulfide. In this case catalyst regeneration is practiced simply by shutting off the hydrocarbon feed, and raising temperature if necessary or desirable; after the desired quantity of catalyst coke is removed, the hydrocarbon feed is simply re-initiated with no resulfiding of the catalyst required.

As previously mentioned an economically important feature of my invention is the conversion of the hydrogen sulfide co-product to elemental sulfur designated herein as the reconversion step. Such reconversion may be accomplished by a two-stage process commonly called the "Claus process." In the first stage, the hydrogen sulfide is burned with air to produce sulfur dioxide at temperatures of between 1300° F. and 3000° F., and in the second stage, the sulfur dioxide is catalytically combined with additional hydrogen sulfide at about 500° F. to produce elemental sulfur. Thus, the two stage process may be represented by the following equations:

$$H_2S + 3/2 O_2 \rightarrow SO_2 + H_2O$$
$$2H_2S + SO_2 \rightarrow 3/2 S_2 + 2H_2O$$

Two modifications of this classic process exists, the first modification in which all of the hydrogen sulfide is mixed with an insufficiency of air for entry into the first stage combustion zone, the second in which only one-third of the hydrogen sulfides is inserted into the first combustion zone, with the remaining two-thirds bypassed to enter the second catalytic zone.

In the process of my invention, where elemental sulfur is a major reactant and hydrogen sulfide a major reaction product, and in which it is economically important to reconvert the hydrogen sulfide to sulfur, using the Claus process or modifications thereof, it has been found that the heat released by the highly exothermic reconversion reactions is very valuable for carrying out the sulfoxidation reactions. Both stages of the reconversion process are exothermic, and as noted above, the first stage combustion is carried out at very high temperatures. In conventional Claus process technology, available heat is converted to low and moderate pressure steam. However, in the process of my invention, the exothermic heat released in the overall reconversion process (a minimum of about 2000 B.t.u. per pound of elemental sulfur produced) fully satisfies the endothermic heat required to carry out the sulfoxidation reactions (700 B.t.u. per pound of elemental sulfur converted), so that it is possible to utilize the heat from the reconversion reactions to preheat the reactants to the sulfoxidation step above the reaction temperature in this step, to the extent required to carry out the sulfoxidation reactions adiabatically. Since the first (combustion) stage of the reconversion step is carried out at temperatures of between 1300° F. and 3000° F. and since the sulfoxidation reactions are carried out between 650° F. to 1100° F., not only does the reconversion step provide a sufficient quantity of heat, but it provides a completely adequate temperature level. If desirable, both the total quantity of heat and the temperature level may be increased by increasing the quantity of hydrocarbons contained in the hydrogen sulfide fed to the reconversion step; this may be accomplished by using light hydrocarbons produced in the sulfoxidation reactions, which have generally no value other than for fuel.

In most cases, it is also desirable to pass small amounts of organic sulfur compounds and tar produced in the sulfoxidation reactions to the reconversion step. Such a practice, eliminates the need for disposing of undesirable by-products, and increases the total heat available and the temperature level of the Claus regeneration step; similarly by this practice, there is little net usage of elemental sulfur in the overall process as previously described.

Utilization of the heat available from the reconversion step may be carried out by various methods known to those skilled in the art. Of considerable importance in this respect is the fact that advances in materials of construction have permitted direct heat exchange to be practiced at temperatures of as high as 1200° F. and in special cases as high as 1500° F. In exchanging the feed components to the sulfoxidation step (generally sulfur and $C_4$-$C_5$ hydrocarbons), it is not desirable to carry hydrocarbon containing streams to a temperature level above 1200° F., and preferably not above 1100° F., because of thermal decomposition and coking in the exchangers. However, sulfur alone may be preheated to as high a temperature possible economically without such fear.

In conventional practice of the Claus process, elemental sulfur is a product and is generally separated from the co-produced water (and small amounts of carbon dioxide, sulfur dioxide and unreacted hydrogen sulfide), and from the large quantity of nitrogen residual from the air used in the combustion stage. However, in the process of my invention, the elemental sulfur formed in the reconversion step is reused directly. Since the water vapor, nitrogen, and traces of sulfur dioxide, carbon dioxide and hydrogen sulfide are not deleterious in the sulfoxidation reactions, in many cases it may be advantageous to pass the total effluent from the reconversion step directly to the sulfoxidation reactor. Such a practice is particularly desirable if it is advantageous to carry out the sulfoxidation at the higher levels of total operating pressure specified herein, but to reduce the partial pressures of the reactants. In this case, the steam and nitrogen from the reconversion step act as diluents in reducing the partial pressure of the hydrocarbons and elemental sulfur in the sulfoxidation reactor. If more or less pure oxygen is used in the reconversion step, instead of air, the temperature level of the first (combustion) stage in the reconversion is considerably raised and, more importantly, there is little or no nitrogen in the reconversion step effluent. This, then, simply and advantageously provides sulfur with a steam diluent to the sulfoxidation reactions if desirable.

In many cases, the reconversion step may be carried out in a system which processes not only hydrogen sulfide from the sulfoxidation reaction, but also hydrogen sulfide from another source. Such other sources may include other sour gases such as obtained from natural gas processing, petroleum refinery operations and the like, and the use of a single system to convert all sources of hydrogen sulfide to elemental sulfur has obvious economic advantages. In such cases, the small net quantity of elemental sulfur required in my process may be derived in fact from the hydrogen sulfide in the sour extraneous gas, and obviously as well, elemental sulfur may be produced as a net product of the overall system.

Figure 2:
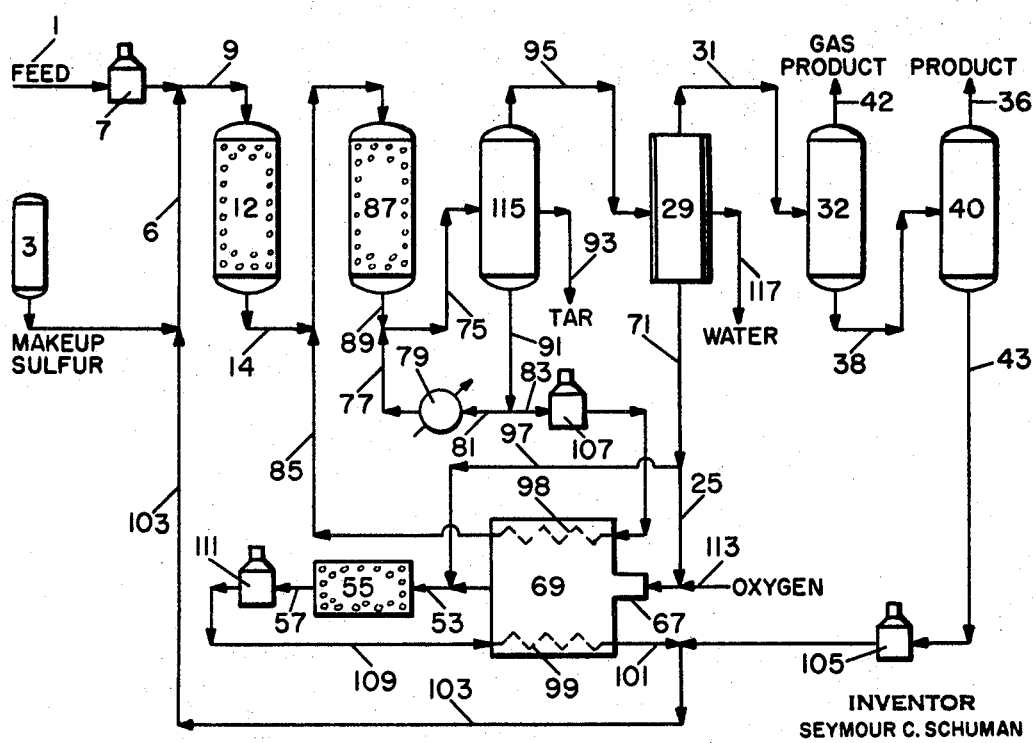
Figure 3:
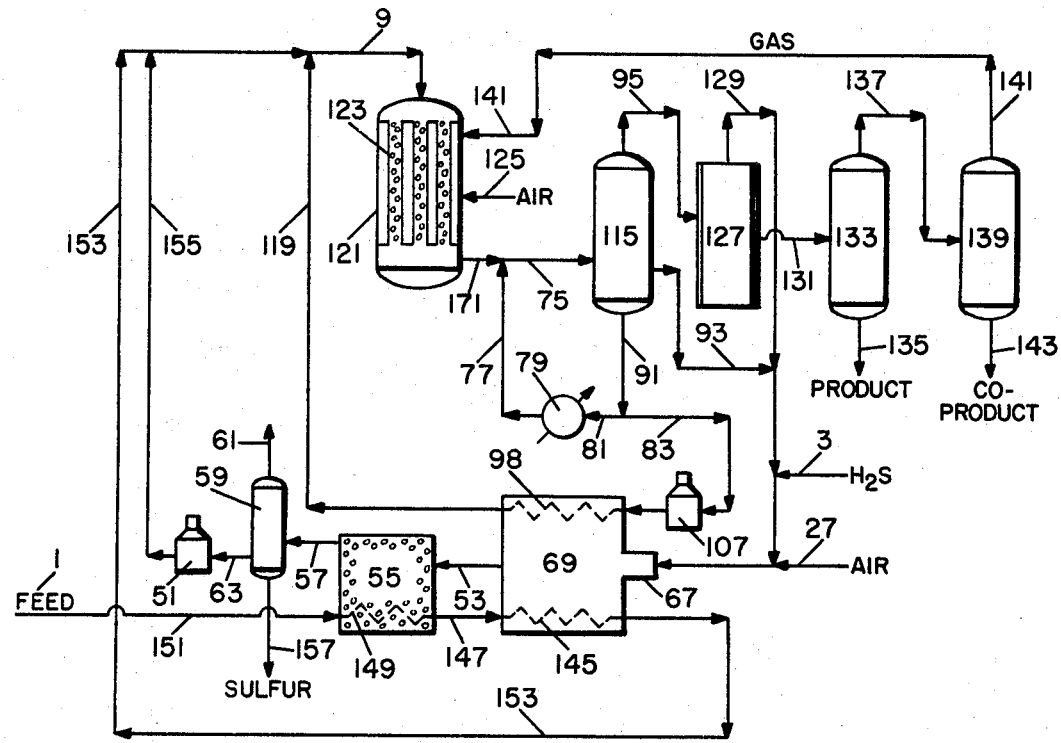

Illustrative plants for practicing the process of my invention are illustrated diagrammatically in FIGURES 1, 2 and 3. It should be understood that the examples illustrated in FIGURES 1, 2 and 3 are representative cases only, and that modifications thereto will suggest themselves to those skilled in the art. Because optimal use of my invention in any given case will depend to a large extent upon the composition of the feed and the precise products and by-products desired, the following examples are not intended to be restrictive thereof.

FIGURE 1 is an apparatus useful for producing butadiene from butane, with the sulfoxidation reaction carried at the lower limits of the temperature range specified herein. Feed hydrocarbons issue from a source 1, and are passed into preheater 7. After issuing from the heater 7, this stream is combined with a recycle stream issuing from line 49 providing all of the elemental sulfur fed to the sulfoxidation reactor as well as recycled butanes and butylenes, obtained as will be described. The total feed passes to the reactor through line 9, substantially above the average reactor temperature.

The reactor 11 is a simple, insulated, cylindrical vessel containing a catalyst composed of 2% nickel sulfide and 14% molybdenum sulfide supported on activated alumina containing 5% silica. The catalyst is prepared by precipitation of the required quantity of salts of nickel and molybdenum on the support, followed by extrudation, calcination, and sulfidization using hydrogen sulfide at 500° F. The reactor is essentially adiabatic, with no heat transferred to or from it. Thus, the catalyst need not be packed in tubes, and the reactor is simple and economic to build.

The reaction products issue from reactor 11 through line 13 substantially below the temperature of the feed. The products are then cooled below the liquefaction point of elemental sulfur and unreacted elemental sulfur removed in separator 15. Such sulfur is recycled back to the process through line 17 as will be described. The uncondensed material from separator 15 is further cooled and passes through line 19 to tower 21 to separate out small quantities of low boiling tar. This tar proceeds from the tower to the reconversion step through line 23. The overhead from separator 21 passes through line 27 into the hydrogen sulfide removal system 29 which may be a conventional ethanolamine system composed of various components for absorption, stripping, and the like. A small waste stream from an adjunct unit also passes through line 3 to the hydrogen sulfide removal system 29; this stream contains light hydrocarbons (methane and ethane) together with hydrogen sulfide. The stripped hydrogen sulfide issues from the removal system 29 through line 71 and is combined with the low boiling tar to provide the feed to the reconversion step.

The essentially hydrogen sulfide-free product gas passes from the hydrogen sulfide removal system through line 31 and is then passed to a conventional furfural extractive distillation system for removal of butadiene, diagramatically shown at 33. Furfural is used as the solvent in this case; however, acetonitrile may also be used. Product butadiene is shown leaving this system at 35 and may be further purified if necessary by any known method.

The overhead from the butadiene removal system is shown passing through line 37, and is then cooled to condense butanes and butylenes which are separated out in tower 39. The light gas product shown issuing from tower 39 through line 41 may be used as fuel or for other purposes. The bottoms from tower 39 is recycled to the sulfoxidation reactor.

The hydrogen sulfide and tar proceed through line 25, and are then mixed with the requisite amount of air from 27 and burned in the reconversion burner 67. The burner effluent is cooled in exchanger 69 and then passes through line 53 to the second reconversion stage 55, as practiced conventionally using an alumina catalyst. The effluent from this stage issues through line 57 into tower 59 where elemental sulfur is separated from the nitrogen and steam; the latter are vented through line 61.

The sulfur obtained from separator 59 proceeds through line 63, mixed with sulfur from line 17 and passes through line 65 to join the stream of recycled butanes and butylenes which have been passed through line 43 and through heater 73. The combined stream, containing predominantly sulfur and recycled hydrocarbons, enters exchanger 69 through line 45, and is exchanged against the sensible heat of the first stage reconversion step vapors. The exchanger is shown schematically with the recycle stream in the tube side 47 and the reconversion step vapors in the shell side of 69. The exchange heats the recycle stream to a temperature level substantially above the average temperature in reactor 11. From the exchanger, the recycle stream passes through line 49 and ultimately enters reactor 11 through line 9.

A specific example of the production of butadiene as illustrated in FIGURE 1 is given in Example 1. All quantities are converted to the basis of 1000 pounds of hydrocarbon feed.

The feed composed of 70% n-butane and 30% n-butenes leaves heater 7 at a temperature of 790° F. The temperature of the total recycle stream (consisting of elemental sulfur obtained from the hydrogen sulfide reconversion, and unconverted hydrocarbons) in line 49 is at 840° F. The combined feed enters the reactor 11 at 825° F. The average temperature in reactor 11 is 740° F., and the products leave the reactor at 655° F.

The average pressure in reactor 11 is 30 p.s.i.a. Sulfur partial pressures are 6.6 p.s.i.a. at the inlet and 1.5 p.s.i.a. at the outlet of the reactor. The composition of the various streams at various points of the process is provided in Table 1. These quantities illustrate that using the process of this invention, it is possible to convert a typical refinery stream containing large amounts of butane to butadiene with excellent yields and minimum formation of undesirable by-products. Net sulfur utilization obtained from a small quantity of sour waste gas is small, and advantageous use is made of the reconversion step to preheat the recycle hydrocarbon feed to the desired reactor inlet temperature and to carry out the reaction adiabatically without difficulties usually resulting from use of fired furnaces.

FIGURE 2 illustrates a useful embodiment of this invention to produce butylene from butane at about the mean of the range of sulfoxidation reaction temperatures specified herein. Apparatus analogous to that shown in FIGURE 1 is indicated by the same reference numerals. Butane and a small quantity of make-up sulfur are fed to the reactor 12 through storage tanks, lines and heaters as shown in 1, 3, 6, 7 and 9. This stream is joined with a stream issuing from the reconversion step through line 103 as will be described. The combined feed enters reactor 12 which, again, is a simple adiabatic cylindrical vessel containing catalyst as described for FIGURE 1. However, in this case, the reactor system is composed of two stages, with products from the first stage leaving the reactor at 14, additional sulfur added through line 85 as will be described, and the combined streams entering the second stage reactor 87. The second stage reactor is also a simple cylindrical vessel containing catalyst, and the reaction in this stage is also carried out adiabatically.

The first stage catalyst is prepared by co-precipitating equal quantities by weight of the sulfides of copper and manganese by passing hydrogen sulfide through solutions of the salts. The sulfide composite is then dried, a small quantity of binder added and the total mass then pelleted to 3/16" diameter pellets and finally calcined at 1000° F. in a nitrogen atmosphere. The catalyst thus prepared is composed of metal sulfides and requires no further treatment before use. The second stage catalyst is composed of 0.05% platinum on alumina, prepared as conventional for such processes as the catalytic reforming of naphtha. It is reduced by treatment with hydrogen for 3 hours at 700° F. before charging to the second stage reactor. When the unit is brought on stream in the process of this invention, the sulfoxidation reactions occurring in the first stage produce hydrogen sulfide, which when passed to the second stage, rapidly converts the active catalytic component in this stage to a sulfide of platinum which is then effective to complete the desired sulfoxidation reactions.

The reaction products issue through line 89 and are quenched by a sulfur stream from line 77 to a temperature level at which no additional reaction will occur. The quenched product stream flows through line 75 into a separator 115 where tar, miscellaneous sulfur compounds and unconverted elemental sulfur are removed, the gaseous products proceeding overhead from the separator.

In the separator 115, elemental sulfur is separated from the tar and organic sulfur compounds, the latter being removed as a by-product through line 93. Elemental sulfur is removed from the bottom of the separator through line 91. Part of this sulfur passes through line 81, is cooled in exchanger 79, and passes through line 77 to quench the reaction products issuing through line 89. The remainder passes through line 83, is vaporized by heater 107, then passes through tubes 98 to exchange with the first stage reconversion gases, and then through line 85 to provide the additional sulfur fed to the second stage reactor 87. Thus, in this case, the overall excess of sulfur used in the sulfoxidation reactions is recycled to the second reaction stage only.

The overhead from the primary separator 115 proceeds through line 95 into the hydrogen sulfide absorption system 29 which scrubs out hydrogen sulfide, as described for FIGURE 1. The unabsorbed hydrocarbon gases leave the hydrogen sulfide absorption system through line 31 and are cooled and separated conventionally in towers 32 and 40 which are interconnected by line 38. In this case, the separation system is designed to yield a butylene product issuing from line 36; because of the advantageous features provided in the process of this invention, the butadiene content of the product removed through line 36 is very small. Unreacted butane passes through line 43, is reheated by heater 105, joins stream 101 as will be described, and passes back to the reactor through line 103. Light hydrocarbon gases are vented through line 42 and used as fuel.

The reconversion system shown in FIGURE 2 is a "bypass" system in which one-third of the hydrogen sulfide is fed to the first (combustion) stage through line 25, with the other two-thirds fed to the lower temperature catalytic chamber through line 97 as dictated by the stoichiometric requirements. In this case, 95% oxygen is used in the first combustion stage supplied through line 113. The oxygen and hydrogen sulfide burn in chamber 67 and the combustion products are then exchanged with two other streams in exchanger 69. One of the exchange streams is the unreacted sulfur as described previously. The second exchange stream is the total effluent from the reconversion step as will be subsequently described.

After leaving exchanger 69, the combustion gases combine with additional hydrogen sulfide from line 97 as previously mentioned and enter the catalytic chamber through line 53. The catalytic chamber 55 is a more or less conventional second stage Claus reactor, but is somewhat smaller and more economically designed because of the use of 95% oxygen instead of air for the combustion step.

In this case, the products leaving the second stage of the reconversion step comprise essentially sulfur and water, with small quantities of nitrogen and argon which exist as impurities of the oxygen used for the combustion, and some unreacted hydrogen sulfide and partially reacted sulfur dioxide. These proceed through line 57 to heater 111 without separation of sulfur, and then pass through line 109 after which they are exchanged in tubes 99 against the combustion gases in exchanger 69. The heated stream issues from the exchanger through line 101 and combines with unconverted butane, after which it is passed through line 103 and without further heating recycled to the sulfoxidation reactor stages 11 and 87. Thus, in this case, the reconverted sulfur is recycled to the sulfoxidation step together with steam which acts as a diluent in the sulfoxidation reactions and is ultimately eliminated at 117.

A specific example of the production of butylene as illustrated in FIGURE 2 is given in Example 2. All quantities are converted to the basis of 1000 pounds of hydrocarbon feed.

The feed is a refinery stream containing over 98% n-butane with isobutane as the predominant impurity. It is desired to convert this stream predominantly to normal butylene for subsequent utilization to make alkylate. Minimum quantities of butadiene are desired.

As indicated in FIGURE 2, the reactor system is adiabatic. Two stages are used with unconverted sulfur recycled only to the second stage. A sulfur quench is employed. Tar is in this case removed as a product. The reconversion step is a "bypass system," in this case using oxygen instead of air in the first (combustion) stage. The heat from the combustion stage is exchanged with the recycled sulfur stream, and with the total reconversion system effluent. Steam produced in the reconversion step is passed directly back to the sulfoxidation reactor.

The average pressure in the sulfoxidation reactors is 85 p.s.i.a.

The hydrocarbon feed is heated by heater 7 to 805° F. After admixture with the recycle stream from 103, the combined feed at 9 is 980° F. After reaction in the first stage adiabatically, the products leaving this stage are at 860° F. The additional sulfur added through line 85 raises this stream to 865° F., and after passing through the second stage, the products are ultimately obtained at 775° F. They are quenched to 350° F. as shown in FIGURE 2. The hydrocarbon recycle stream is heated to 790° F. by heater 105. Exchange of the total reconversion effluent against the first stage of the Claus system raises the former to 1350° F. After this stream is mixed with the hydrocarbon recycle stream a combined feed stream is obtained at 9 of 980° F. as described.

Table 2 illustrates material balance quantities and compositions extant at various points of the processed system. These indicate a net yield of butylene of 91% (96% of the theoretical), with only minor quantities of butadiene, light gas, and tar. The tar yield of about 1% is sufficiently small that it does not pay to pass this stream back to the sulfoxidation reactors.

FIGURE 3 illustrates an embodiment of this invention suitable for the production of isoprene from isopentane at the highest level of temperatures specified in this invention, so as to produce isoprene, single-pass, with a high conversion of isopentane.

In this case the hydrocarbon feed stream from source 1 passes through line 151 and is preheated in exchanger 149 by the reaction heat from the second stage of the Claus plant. The hydrocarbon feed stream then passes through line 147 and is further heated by exchange against the first stage of the Claus plant. In FIGURE 3 this is shown schematically by exchange of the feed hydrocarbon in pipes 145 against the combustion gases in apparatus 69. The feed hydrocarbon stream, now at an elevated temperature which is, however, substantially below the reaction temperature for the sulfoxidation step, then passes through line 153 and ultimately enters the reactor through line 9.

Two other streams provide the total reactor feed. These streams comprise substantially all of the elemental sulfur fed to the reactor; as will be described, these are the unconverted sulfur recycled through line 119, and the sulfur obtained by reconversion of the hydrogen sulfide product issuing from line 155. The combined feed stream enters the reactor through line 9.

Reactor 121 is in this case isothermal rather than adiabatic, and to provide the endothermic heat of the sulfoxidation reaction, must be heated. As shown in FIGURE 3, this is carried out conventionally with the catalyst placed in relatively small diameter tubes one of which is indicated at 123, and fired with product gas from line 141 and air shown entering the reactor through 125. Such an isothermal reactor is considerably more expensive than the adiabatic reactor shown in FIGURES 1 and 2; it is justified in this case because of the higher value of the product isoprene and the high single pass conversion obtained.

The catalyst is prepared by crushing and screening a high iron-containing bauxite ore to essentially 8 to 10 mesh particles and impregnating the particles with a solution containing the required amounts of chromium acetate and potassium phosphate. The particles are then dried, and then calcined at 1300° F. They are then charged to the reactor which is heated up to 700° F., after which the catalyst is pretreated for 12 hours with a mixture of carbon disulfide and hydrogen. The catalyst thus prepared contains 16% iron sulfide, 9% chromium sulfide, 1.2% potassium phosphate and 69% alumina, with other components also present as impurities of the bauxite originally used.

The products issue from reactor 121 through line 171, are quenched, and proceed to tower 115 where sulfur and tar are removed as in FIGURE 2. The overhead uncondensed product gases leave the separator through line 95 and are then recovered as will be described. A small amount of tar which is produced leaves the separator through line 93; in this case, it is passed to the reconversion step to recover elemental sulfur. The net unreacted elemental sulfur proceeds through line 83, is vaporized by heater 107, and exchanged against the first stage Claus plant effluent as shown schematically in FIGURE 3 by exchange of tubes 98 against shell 69. This unreacted elemental sulfur is then recycled back to the reactor through line 119 as previously described.

The low boiling products from separator 115 leave through line 95 and then enter the absorption-stripper 127. In this system, shown diagrammatically, the heavier hydrocarbon products are separated from the lighter products and hydrogen sulfide. Any suitable solvent such as heavy naphtha may be employed for the absorption solvent. After stripping the absorbed heavier hydrocarbons from the solvent, the hydrocarbons proceed through line 131, and are cooled to liquefy the product fraction boiling above about 50° F. This product primarily isoprene, is separated from lower boiling co-products in separator 133 and withdrawn through line 135. It consists of over 90% isoprene. Minor amounts of impurities simultaneously removed with the product may be removed by additional purification steps if required.

The overhead from separator 133 passes through line 137 and is further cooled before entering separator 139. In this separator, relatively small quantities of butadiene and butylenes together with still smaller quantities of butanes are removed as co-products through line 143. The overhead gas from tower 139 issues through line 141 to provide a substantial quantity of the required reaction heat by firing with air through line 125.

In this case reconversion of the hydrogen sulfide produced is accomplished in a much larger Claus system which exists at the plant site. This system is used to convert hydrogen sulfide obtained from other operations to elemental sulfur, and it is convenient and economical to pass the hydrogen sulfide obtained from sulfoxidation to this existing unit. Thus, the hydrogen sulfide obtained from the other operations and supplied at 3, as in Example 1, supplies the small net quantity of sulfur needed to replace losses in the sulfoxidation step; however, as shown in the figure, the Claus system produces much more sulfur than needed to supply these requirements, and this excess is withdrawn and market as usual.

Thus, the hydrogen sulfide obtained from absorption-stripper 127 passes through line 129, is mixed with tar from line 93, and then joins the much larger primary stream of hydrogen sulfide from 3 obtained from the adjunct external plant operations. The total stream is mixed with a stream of air from 27 and passes to the high temperature Clause stage 67. The hot combustion gases are exchanged as previously described in exchanger 69. They then proceed through the second catalytic reconversion stage, the reaction heat from which is employed as previously described to preheat the isopentane feed. Nitrogen and water are removed through line 61, and unneeded elemental sulfur at 157. Sulfur required for the sulfoxidation step is vaporized in heater 51 and returned to the reactor through line 155.

A specific example of the production of isoprene in accordance with FIGURE 3 is given in Example 3. All quantities are converted to the basis of 1000 pounds of hydrocarbon feed.

The process system is as in FIGURE 3. The feed is 94% isopentane (with smaller quantities of normal pentane, isobutane, and normal butane); it is desired to convert this feed substantially to isoprene.

As indicated in FIGURE 3, an isothermal reaction system is utilized in this case with part of the reaction heat supplied by a fired reactor. The reaction is carried out single pass with respect to the hydrocarbon feed. Products are quenched. Unconverted elemental sulfur is recycled. Hydrogen sulfide is passed to a much larger adjunct Claus plant which converts the hydrogen sulfide back to sulfur and supplies a small net quantity of sulfur to replace losses from the sulfoxidation system. A considerable part of the hydrocarbon feed preheat is derived by exchange in the reconversion system.

The average pressure in the reactor is 10 p.s.i.a.

The feed hydrocarbon stream after exchange in the reconversion system is raised to 815° F. in line 153. The recycled sulfur passing through line 119 is raised to 1250° F. by exchange in 98. The reconverted sulfur after passing heater 51 is at 1025° F. The reactor total feed at line 9 is at 865° F. The reaction is carried out isothermally at 1080° F.

Table 3 summarizes material balance quantities based on 1000 pounds of hydrocarbons as net feed to the process. The material balance is taken only around the sulfoxidation process, excluding the very large quantities of hydrogen sulfide fed to the Claus system at 3, and the large quantity of sulfur withdrawn at 157. The composition of the various streams and the ultimate product yields indicated in Table 3 show that this difficult conversion can be carried out using sulfoxidation with a yield of 75% isoprene (80% based on feed isopentane and 84% of the theoretical). About 7.5% of byproducts are obtained. Yields of tar are small, and the net elemental sulfur feed only 1.6% based on hydrocarbons.

It should be borne in mind that FIGURES 1-3 are, for simplicity, highly schematized. Pumps, compressors, heaters and coolers are not shown except to illustrate a feature of the invention. Details of the reconversion step are largely omitted, including the desirability of condensing sulfur where produced after the first high temperature conversion stage, the desirability of utilizing multiple second stages with possible intermediate condensation of sulfur, the need for incineration of the reconversion gas product (when this stream does not go back to the sulfoxidation step) to eliminate air pollution, and the like. Such conventional procedures are well-known to those skilled in the art and are amply described in the literature.

TABLE 1.—PROCESS QUANTITIES AND YIELDS FROM EXAMPLE 1

| | Pounds | | | | | | |
|---|---|---|---|---|---|---|---|
| | $C_4H_{10}$ | $C_4H_8$ | $C_4H_6$ | $S_2$ | $H_2S$ | Gas | Tar |
| Fresh feed to heater 7 | 706 | 294 | | | | | |
| Hydrogen sulfide from 3 | | | | | 30 | | |
| Hydrogen recycle from 43 | 830 | 1,730 | | | | | |
| Unreacted sulfur recycled in 17 | | | | 230 | | | |
| Reconverted sulfur stream recycled in 63 | | | | 770 | | | |
| Total feed to reactor 11 | 1,536 | 2,024 | | 1,000 | | | |
| Total product from reactor 11 | 830 | 1,730 | 765 | 230 | 810 | 162 | 33 |
| Ultimate yields per 1,000 pounds fresh feed | | | 765 | | | 162 | |

TABLE 2.—PROCESS QUANTITIES AND YIELDS FROM EXAMPLE 2

| | Pounds | | | | | | | | | |
|---|---|---|---|---|---|---|---|---|---|---|
| | $C_4H_{10}$ | $C_4H_8$ | $C_4H_6$ | $S_2$ | $H_2S$ | Gas | Tar | $O_2$ | $N_2$ | $H_2O$ |
| Fresh feed to reactor 12 | 1,000 | | | 10 | | | | | | |
| Hydrocarbon recycle from 43 | 333 | | | | | | | | | |
| Unreacted sulfur recycled in 85 | | | | 125 | | | | | | |
| Hydrogen sulfide to reconversion from 71 | | | | | 606 | | | | | |
| Hydrogen sulfide to 67 | | | | | 201 | | | | | |
| Hydrogen sulfide to 53 | | | | | 405 | | | | | |
| High purity oxygen to 67 | | | | | | | | 284 | 16 | |
| Reconverted sulfur stream in 109 and 101 | | | | 544 | 29 | | | | 16 | 320 |
| Total feed to reactor 12 | 1,312 | 21 | | 554 | 29 | | | | 16 | 320 |
| Additional feed to reactor 87 | | | | 125 | | | | | | |
| Total product from reactor 87 | 333 | 910 | 28 | 125 | 612 | 19 | 11 | | 16 | 320 |
| Ultimate yields per 1,000 pounds fresh feed | | 910 | 28 | | | 19 | 11 | | | |

TABLE 3.—PROCESS QUANTITIES AND YIELDS FROM EXAMPLE 3

| | Pounds | | | | | | | |
|---|---|---|---|---|---|---|---|---|
| | C₅H₁₂ | C₅H₁₀ | C₅H₈ | C₄ | S₂ | H₂S | Gas | Tar |
| Fresh feed to 151 and 153 | 956 | | | 44 | | | | |
| Net hydrogen sulfide used from 3 | | | | | | 17 | | |
| Unreacted sulfur recycled in 119 | | | | | 461 | | | |
| Reconverted sulfur stream recycled in 155 | | | | | 824 | | | |
| Total feed to reactor 121 | 956 | | | 44 | 1,285 | | | |
| Total product from reactor 121 | 19 | 28 | 768 | 67 | 461 | 856 | 39 | 46 |
| Ultimate yields per 1,000 pounds fresh feed | 19 | 28 | 768 | 67 | | | 39 | |

I claim:

1. The process of selectively dehydrogenating an aliphatic hydrocarbon containing 4 or 5 carbon atoms to produce as a major reaction product of hydrocarbon containing the same number of carbon atoms but at least one more ethylenic bond, which comprises passing the first-said hydrocarbon with elemental sulfur in the ratio of between 0.25 and 2.5 moles of $S_2$ per mole of $C_4$ and $C_5$ in the total feed in contact with a solid catalysts comprising as its main active constituent a material selected from the group consisting of sulfides of metals Periodic Table Groups IV, V, VI–A, VII–A and VIII and of the rare earth metals with atomic numbers between 59 and 72, and mixtures thereof, in a catalytic amount, at a temperature between about 650° F. and 1100° F., and recovering from the effluent from said reaction zone said hydrocarbon product.

2. The process of claim 1 in which the reaction is carried out at a pressure between 5 and 100 p.s.i.a.

3. The process of claim 1 in which the contact time in the reaction zone substantially exceeds 0.1 second.

4. The process of claim 1 in which said reactants are mixed prior to entry to the reaction zone and the reaction is carried out between about 750° F. and 1000° F.

5. The process of claim 1 in which the catalyst is disposed in a fixed, foraminous bed.

6. The process of claim 1 in which the catalyst comprises said metal sulfide disposed on a substantially inert support.

7. The process of claim 1 in which the reaction is carried out adiabatically.

8. The process of claim 1 in which the first-said hydrocarbon is n-butane and said hydrocarbon product is butadiene.

9. An oxidative process comprising (a) passing an aliphatic hydrocarbon containing 4 or 5 carbon atoms together with elemental sulfur in the ratio of between 0.25 and 2.5 moles of $S_2$ per mole of $C_4$ and $C_5$ in the total feed through a reaction zone in contact with a solid catalyst comprising as its main active constituent a material selected from the group consisting of sulfides of metals of Periodic Table Groups IV, V, VI–A, VII–A and VIII and of the rare earth metals with atomic numbers between 59 and 72, and mixtures thereof, in a catalytic amount, at a temperature between about 650° F. and 1100° F. to produce as a major product a hydrocarbon containing the same number of carbon atoms but at least one more ethylenic bond, together with hydrogen sulfide, (b) contacting a substantial part of the hydrogen sulfide with an oxygen-containing gas at elevated temperatures to produce elemental sulfur, and (c) removing from the effluent of the first-said reaction zone said hydrocarbon product.

10. The process of claim 9 in which the first-said reaction is carried out at a pressure between 5 and 100 p.s.i.a.

11. The process of claim 9 in which the contact time in the first-said reaction zone substantially exceeds 0.1 second.

12. The process of claim 9 in which the reactants to the first-said reaction zone are mixed prior to entry to the reaction zone and the reaction is carried out between about 750° F. and 1000° F.

13. The process of claim 9 in which the catalyst in the first-said reaction zone is disposed in a fixed, foraminous bed.

14. The process of claim 9 in which the catalyst in the first-said reaction zone comprises said sulfide disposed on a substantially inert support.

15. The process of claim 9 in which the first-said reaction is carried out adiabatically.

16. The process of claim 9 in which the first-said hydrocarbon is n-butane and the second-said hydrocarbon is butadiene.

17. The process of claim 9 in which a substantial part of the elemental sulfur produced in the second step is utilized as feed to the first-said reaction zone.

18. The process of claim 17 in which a substantial portion of the heat released in the second step is utilized to preheat the reactants to the first-said reaction zone.

19. The process of claim 17 in which the oxygen-containing gas fed to the second step is substantially purified oxygen, and the products from the second step are fed without separation to the first-said reaction zone.

References Cited

UNITED STATES PATENTS

| 2,131,089 | 9/1938 | Beeck et al. | 260—680 X |
| 2,197,872 | 4/1940 | Monroe et al. | 260—683 |
| 2,322,857 | 6/1943 | Liedholm et al. | 260—683.3 |
| 2,376,988 | 5/1945 | Shoemaker | 260—680 |

PAUL M. COUGHLAN, JR., *Primary Examiner.*